United States Patent

Strange

[15] 3,680,720

[45] Aug. 1, 1972

[54] TRACK LAYING EQUIPMENT AND CARRIER THEREFOR

[72] Inventor: Lyle H. Strange, 522 S. Yates St., Denver, Colo. 80219

[22] Filed: Jan. 14, 1970

[21] Appl. No.: 2,762

[52] U.S. Cl..................214/38 R, 180/9.48, 212/1, 212/49, 280/402, 280/415
[51] Int. Cl.................................B60f 5/00
[58] Field of Search............214/38 R, 512, 142, 506; 280/402, 415 R, 34; 212/1, 48, 49

[56] References Cited

UNITED STATES PATENTS

| | | | |
|---|---|---|---|
| 3,336,041 | 8/1967 | Bouley | 280/415 X |
| 3,037,571 | 6/1962 | Zelle | 280/34 X |
| 3,266,636 | 8/1966 | Dorn | 214/142 X |
| 3,013,683 | 12/1961 | Harris | 214/506 |
| 3,169,650 | 2/1965 | Soyland | 280/402 X |
| 3,321,215 | 5/1967 | Kampert | 280/415 R |

FOREIGN PATENTS OR APPLICATIONS

| | | | |
|---|---|---|---|
| 1,003,359 | 9/1965 | Great Britain | 280/415 |
| 458,515 | 8/1949 | Canada | 280/402 |

Primary Examiner—Robert G. Sheridan
Attorney—C. B. Messenger

[57] ABSTRACT

A system for over-the-road hauling of track laying equipment, such as cranes, wherein hoist and/or counterweight components of the equipment are used to elevate the tracks away from ground contact for suspension between a wheeled trailer and a conventional tractor. While the equipment is suspended, the tracks may be retracted to minimize the over-the-road width, or tracks of increased ground contacting area may be laterally extended for improved stability and/or maneuverability at times of use.

5 Claims, 6 Drawing Figures

PATENTED AUG 1 1972
3,680,720
SHEET 1 OF 2
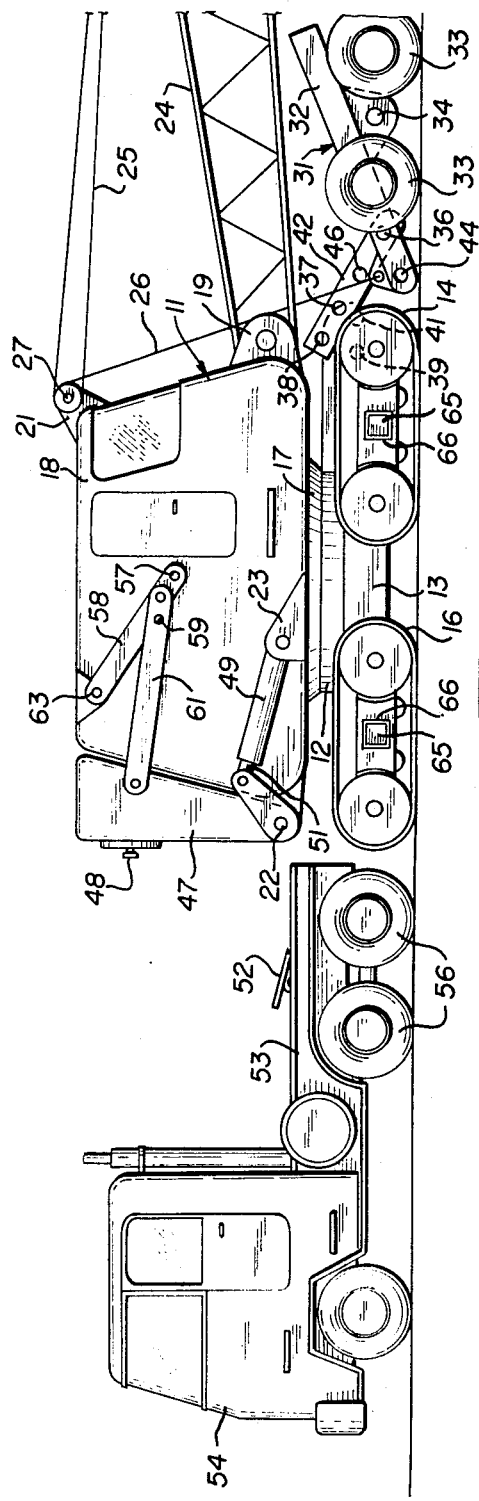
Fig_1
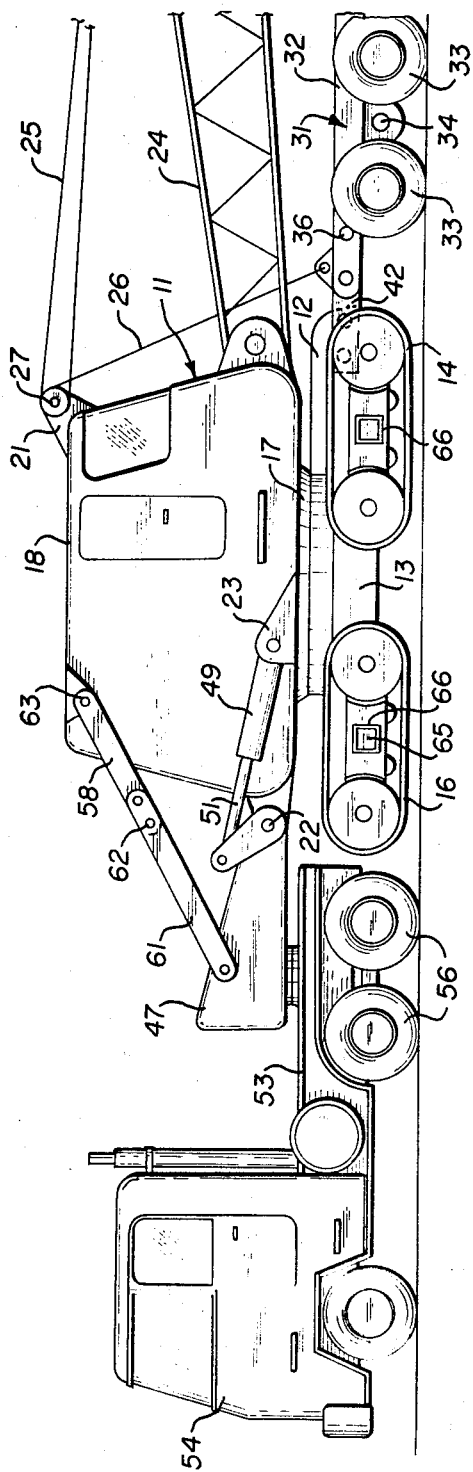
Fig_2
INVENTOR.
LYLE H. STRANGE
BY
*[signature]*
ATTORNEY

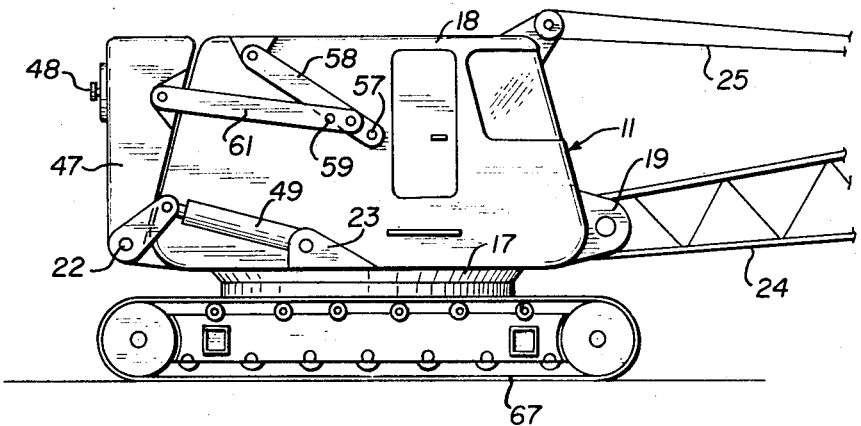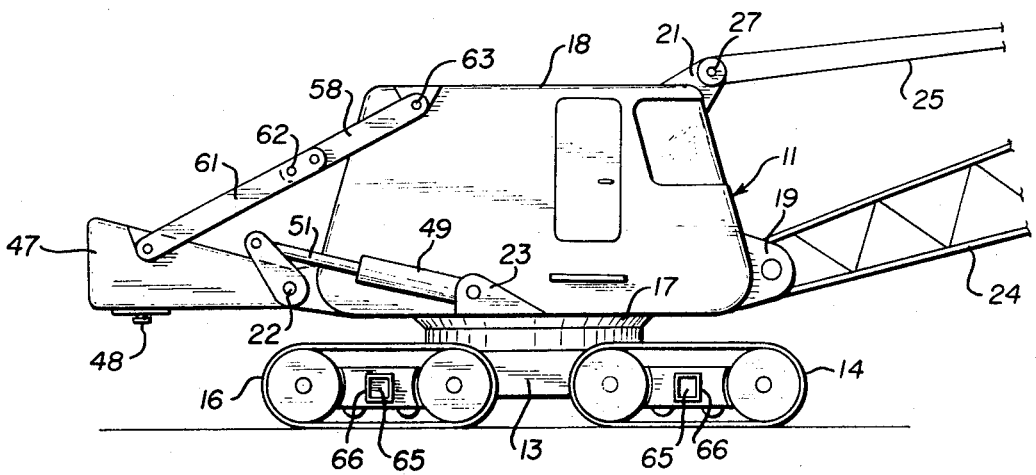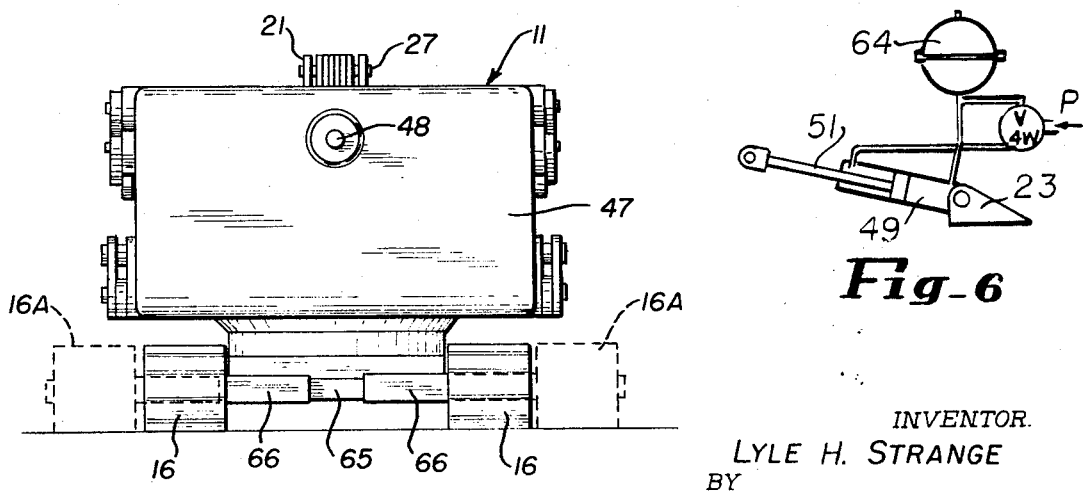

3,680,720

TRACK LAYING EQUIPMENT AND CARRIER THEREFOR

BACKGROUND OF THE INVENTION

In the field of large earth moving or hoisting equipment, power shovels, cranes and drag lines have been developed that are well adapted to certain specific uses. In such field of development there has been a substantial increase in size and load capacities in order to improve the handling capacity for the various rigs so that more work may be accomplished in shorter periods of time. Because of differences in mobility requirements the basic crane units of previous years have been developed along divergent lines. The industry now has a full range of truck or wheel mounted cranes that are well adapted for movement along smooth highways and that may be used on work sites where reliable footing is available or has been prepared. At the same time the development of track mounted cranes has continued, since this type mounting is preferred where the largest loads are to be handled or where uneven terrain may be encountered. The improved stability of track mounted cranes under conditions where outrigger supports are not regularly or conveniently useable and the increased on-site mobility in general favors the use of track mounted systems if movement of the unit between work sites is not too burdensome. Under present between-site transport conditions track mounted cranes have an inherent drawback where work is to be accomplished at several sites during a work week or day. The improved between-site mobility of truck mounted cranes has given rise to the development of truck mounted or motor cranes of extreme size and capacity even though such units may be less maneuverable or may have decreased mobility when located on a work site.

It is a purpose of the present invention to provide a crane having improved on-site operational characteristics in part gained through use of a track mounting system and improved between-site mobility obtained through use of wheel carrier attachments that are used in conjunction with operational features of the crane. Through use of such combination system this invention provides a track mounted crane of increased work base and stability that can be conveniently moved between work sites by tractor drawn wheel components that may be speedily applied or removed to efficiently carry the crane system from one work site to another without exceeding highway width or axle load limitations.

SUMMARY OF THE INVENTION

The present invention provides a track support and mounting system for cranes wherein the gauge width for the tracks may be changed to provide increased outrigger support for the crane during periods of operations and a narrowed configuration for over-highway transport. Additionally the invention provides a system whereby the crane base and all associated crane components may be raised above a position of ground contact for support in such position on a wheel mounted attachment whereby the combined unit may be moved by a conventional over-the-highway tractor having a fifth wheel hitch. Winch and hoist components of the crane and a counterweight mount that is normally useful to increase the load or load span capability of the crane are cooperatively used to elevate the crane to its over-the-highway carried position. When the crane is elevated, the track supports are above ground contact, and accordingly movement of the track from a retracted to an extended gauge position is facilitated. The system provides improved over-the-highway mobility, and the unit can accordingly be moved from one work site to another in more expeditious manner. The on-site stability and the load radius capacity of the operating unit is at the same time improved by the extendable tracks that may have an increased ground contacting area and by the counterweight components.

BRIEF DESCRIPTION OF THE DRAWINGS

FIG. 1 is a side elevation illustrating the prepositioning of the carrier components, FIG. 2 is a side elevation similar to that of FIG. 1 showing the carrier components in an alternate position for effectively picking up a track layer crane, FIG. 3 is a side elevation showing a counterweight in lowered position for improved operational stability, FIG. 4 is a rear elevation showing the counterweight in raised position with the track supports being shown in alternate positions, FIG. 5 is a side view similar to that of FIG. 3 illustrating a separate track support embodiment of the invention with the counterweight in raised position, and FIG. 6 is a schematic drawing of a hydraulic system that may be used.

DESCRIPTION OF THE PREFERRED EMBODIMENTS

A first preferred embodiment of the invention is shown in FIGS. 1–4. In these Figures crane unit 11 includes a supporting base frame 12 which has longitudinal frame components 13 to support track carrier systems 14 and 16. A turntable 17 is disposed centrally on the base frame 12, and a crane cab 18 is positioned thereon for rotating movement with respect to the base frame 12. An engine power unit, hoisting drums, brakes and clutches, etc. (not shown) are positioned within the cab and supported on a rotating frame attached to turntable 17 in conventional manner. The rotating frame provides support for the cab 18, a front boom mount 19, a front gantry 21, a rear counterweight pivot support 22, and for a counterweight actuator cylinder mount 23. A crane configuration providing a crane boom 24 is illustrated, though a shovel front could alternately be provided. The boom 24 is maintained in raised or lowered position by boom hoist lines 25 that are operable to raise and lower the boom to desired positions. A separate hoist line 26 may be reeved about fair lead 27 for engagement with a carrier attachment 31 shown in FIGS. 1 and 2.

Carrier attachment 31 has a wheel support frame 32 including a tandem mount for the wheels 33 with the tandem mount or walking beam suspension being pivotally movable about the pivot 34. The frame 32 extends forwardly of the pivot 34 and the supporting wheels, and it is itself pivotally attached to a frame extension 42 by a through shaft 36. The forward end of extension frame 42 has a plurality of attaching pin holes 37 and 38, and these holes may be moved into position of registration with respect to mating holes 39 and 41 in the longitudinal frames 13 for the base 12. When it is desired to move the crane 11, pins are first placed through mated holes 37 and 41 at opposite sides of extension frame 42 and frames 13. Thereafter a hoist drum connected to the line 26 is operated, and the line 26, which is attached to a forward portion of the carrier frame 32, is retrieved. A scissors action results bringing the frame 32 and frame extension 42 into aligned positions so that locking pins may be inserted through then mated holes 38 and 39. A further lock is established between the holes 44 on frame 32 and the holes 46 on the frame 42. When the frames 32, 42 and 13 are in aligned positions, the forward end of the crane 11 and the forward support tracks 14 will be raised above the supporting ground. This self-elevating maneuver is powered by components of the crane 11 itself.

Subsequently, or at the same time, the rear portion of the crane is raised to the out-of-ground contact position as shown in FIG. 2 by a powered extension of the rear counterweight 47. As shown in FIG. 1, a fifth wheel hitch 48 is provided in central position on counterweight 47. A hydraulic cylinder 49 having a shaft 51 is extended, and the counterweight 47 is lowered until the fifth wheel hitch 48 is brought into engagement with a fifth wheel plate 52 on the frame 53 of a conventional type over-the-road tractor 54. After initial contact is established between the fifth wheel components 48–52, additional extension of the hydraulic cylinder 49 will transfer the weight of the crane 11 to the fifth wheel mount and through such mount to the tractor support wheels 56. At full extension for the hydraulic cylinder 49 the rear track supports 16 will be raised out of contact with the ground, and the crane will then be suspended between the tractor 54 and the carrier trailer 31.

At the same time that the crane is raised to its carry position as shown in FIG. 2 a link system interconnecting the cab 18 and the counterweight 47 will be brought to a full extended position. In such extended position a lock hole 57 on the cab link 58 is aligned with a catch hole 59 on the counterweight link 61. A safety pin 62 may be inserted through such aligned holes, and thereafter the load on the cylinder 49 can be relieved with the links 58 and 61 in locked condition. A direct load transmission between the fifth wheel mount 48–52 and the cab pivot 63 is thus established. Since the cab pivot 63 can be rigidly supported by the rotating base 12 or a rear gantry structure or the like, over-the-road shocks are carried by permanent and rigid components thereby avoiding excess shock loadings on the counterweight positioning cylinders 49. Where pressure relief valves and a replenishment supply is provided or where, as shown in FIG. 6, a charged accumulator 64 is connected in the hydraulic circuits on the load side of the cylinder 49, a portion of the crane load can be efficiently supported or snubbed by the cylinders 49. Where this type of system as shown in FIG. 6 is used severe jolting of the suspended load represented by the crane 11 is avoided, and similarly better load conditions are maintained for the tractor 54.

A first and primary advantage of the described system is inherent in the fact that a track mounted crane or other similar equipment can with this combination be moved from one work site to another as a wheel carried load. The requirement for a low bed trailer is eliminated, and loading and unloading maneuvers are substantially simplified. Where low bed trailers were previously used it was either necessary to walk a crane up and over some rear support wheels and axles for the trailer or the crane was loaded in position transverse to the length of the trailer. With transverse loadings road width limitations were always exceeded, and with both types of loadings the on-loading and off-loading maneuvers were often hazardous. By comparison, the pickup maneuvers described herein can be accomplished in a substantially shortened period of time. Further, the crane carrier tracks are aligned longitudinally to minimize the width of the load that is to be moved over the highway, and as an added benefit, any over the highway type of tractor which has a fifth wheel mount can be used as a towing unit.

A prime advantage results from the fact that the crane is not only elevated and above ground contact (as it would be if it were supported by the deck of a low bed trailer), but the suspension tracks are in fact free. Accordingly, the system can be used to facilitate maintenance of the track system for the equipment. The tracks could even be driven while the crane or other equipment is in the elevated carry position, and accordingly the rollers and drives could be more efficiently serviced or repaired.

This same out-of-contact elevation makes it possible to incorporate further advantageous features in the equipment construction. The support tracks can be moved to alternate gauge widths as shown in FIG. 4, thereby modifying the outrigger support characteristics for the equipment itself. With the tracks in the extended position as shown in FIG. 4 at 16a a wider working base is provided for a crane 11. With a wider base larger loads and increased loads at increased turn radiuses away from the center turntable 17 can be more safely handled. This increased stability is obtained by providing telescoping components 66 on the track carrier axle 65. Separate jacks or other mechanisms (not shown) can be provided to move the tracks and their telescoping carriers 66 laterally to the alternate positions as desired. Extending or retracting operations for the supporting tracks and for the drive mechanisms for the tracks can be easily accomplished when the crane 11 is in the elevated out-of-contact position.

This same advantageous feature providing increased stability due to lateral adjustments in the gauge width for the tracks is available whether the track support system is of the multi-track design shown in FIGS. 1–4 or whether a single track is used as shown in FIG. 5. An extra benefit is obtained when the single track system of FIG. 5 is to be used.

Normally the length of track that is in position for ground contact must be limited so that a proper length-to-width ratio can be maintained for the track carrier system. If the track length is extended, it becomes difficult or impossible to accomplish vehicle turns when the equipment is being used over particular types of terrain. Because of the fact that turns cannot be accomplished when the established length-to-width ratio is exceeded and because of the further fact that the width of the track layer equipment is from a practical standpoint limited by road width and clearance limitations, the present length of track layer equipment support systems is itself limited. Oppositely, from the standpoint of increased equipment stability, an increased track length would be highly desirable. With the present system for moving the tracks to laterally extendable positions and with the present carrier system that elevates the track layer equipment to an out-of-ground contact position increased track lengths for a continuous track system, as shown in FIG. 5, are not only feasible but highly practical.

I claim:

1. An over-the-road and highway transporting system for moving a frame supported crane type unit having a powered hoist component in addition to the propulsion system thereof using fifth wheel equipped over-the-road tractors as a motive power source comprising a carrier attachment, a carrier frame for said carrier, an axle and road wheel components on said carrier frame, a pivot element on said carrier frame, a frame extension disposed outwardly from said pivot and cooperative with said crane and carrier frames for selectively attaching said frames together, means for selectively interconnecting the force exerting hoist component of said crane unit for moving at least one of said frame elements about said pivot for changing the above ground elevation of said carrier frame to raise the propulsion system of said crane equipment above and away from ground or other restraining contact, lock means for holding said carrier frame, frame extension and crane frame in the raised configuration, and means providing a fifth wheel hitch for said crane unit for engagement with the fifth wheel of said over-the-road tractors.

2. Structure as set forth in claim 1 wherein said pivot element pivotally joins said frame extension to said carrier frame and the hoist component of said crane unit is engaged to said carrier frame in position away from said pivot for raising the carrier frame to an elevated position whereby the crane unit is disposed above and away from ground or other restraining contact.

3. The system as set forth in claim 1 and further comprising a pivotally mounted counterweight for said crane unit, power means for moving said counterweight to a lowered and extended position for increasing the moment thereof whereby the load handling capacity of said crane is changed, and wherein said fifth wheel hitch is disposed on said counterweight with the counterweight moving power means being used additionally to raise the propulsion system of the crane unit above the supporting ground as the counterweight is forcibly lowered.

4. The system as set forth in claim 3 and further comprising shock absorber means operatively disposed between said fifth wheel and crane unit for minimizing the transmission of road shocks to said crane unit.

5. The system as set forth in claim 4 wherein a hydraulic system provides said shock absorber and counterweight power means.

* * * * *